US012269270B2

(12) United States Patent
Otani et al.

(10) Patent No.: US 12,269,270 B2
(45) Date of Patent: Apr. 8, 2025

(54) LIQUID STORAGE CONTAINER, LIQUID CONSUMPTION APPARATUS, AND RECORDING APPARATUS

(71) Applicant: CANON KABUSHIKI KAISHA, Tokyo (JP)

(72) Inventors: Isao Otani, Kanagawa (JP); Satoru Takahashi, Kanagawa (JP); Hiroaki Kusano, Tokyo (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 18/296,692

(22) Filed: Apr. 6, 2023

(65) Prior Publication Data

US 2023/0339232 A1 Oct. 26, 2023

(30) Foreign Application Priority Data

Apr. 20, 2022 (JP) ................................ 2022-069349

(51) Int. Cl.
*B41J 2/175* (2006.01)

(52) U.S. Cl.
CPC ....... *B41J 2/17513* (2013.01); *B41J 2/17523* (2013.01)

(58) Field of Classification Search
CPC .... B41J 2/175; B41J 2/17503; B41J 2/17506; B41J 2/17509; B41J 2/17513; B41J 2/17523; B41J 2/17559; B41J 2002/17516
See application file for complete search history.

(56) References Cited

U.S. PATENT DOCUMENTS

2017/0173966 A1 6/2017 Kawate et al. ...... B41J 2/17506
2021/0370682 A1 12/2021 Murakami et al. ...... B41J 2/175
2022/0363066 A1 11/2022 Ojima et al. ............ B41J 2/175
2022/0396089 A1 12/2022 Okuyama et al. ..... B43K 11/00

FOREIGN PATENT DOCUMENTS

CN 214681370 * 11/2021 .............. B01F 11/00
CN 214694135 * 11/2021 .............. C12M 1/02
JP 2006-001171 1/2006
JP 2017-113891 6/2017

OTHER PUBLICATIONS

U.S. Appl. No. 18/319,427, filed May 17, 2023.
U.S. Appl. No. 18/324,095, filed May 25, 2023.

* cited by examiner

*Primary Examiner* — Anh T Vo
(74) *Attorney, Agent, or Firm* — Venable LLP

(57) ABSTRACT

A liquid storage container capable of storing liquid containing a precipitation component and externally supplying the liquid allows the liquid to be externally supplied to have a uniform precipitation component concentration. The liquid storage container can store liquid containing a precipitation component and externally supply the liquid and includes a storage portion that stores the liquid, a supply port that opens to the outside of the storage portion, a pipe having one end connected to the supply port and the other end connected to a suction port that opens to the inside of the storage portion, and an agitation member provided near the suction port for agitating the liquid stored in the storage portion.

15 Claims, 9 Drawing Sheets

LIQUID STORAGE CONTAINER, LIQUID CONSUMPTION APPARATUS, AND RECORDING APPARATUS

BACKGROUND OF THE INVENTION

Field of the Invention

The present invention relates to a liquid storage container, a liquid consumption apparatus, and a recording apparatus.

Description of the Related Art

Inkjet recording apparatuses that use pigmented inks have been known. Pigmented inks are advantageous for their high water resistance and light resistance. Meanwhile, the pigment component contained in ink may settle in a liquid storage container, and when the ink has not been used for a long period of time, the pigment component concentration becomes lower in the upper part of the liquid storage container and higher in the lower part, which may cause density non-uniformity during printing.

In this regard, Japanese Patent Application Publication No. 2017-113891 has proposed a liquid storage container having a first flow path that communicates between a first suction port located in a vertically lower part in the container and a supply port for externally supplying liquid in the container, and a second flow path communicates between a second suction port located in a vertically higher part in the container and a supply port. In the liquid storage container, liquid having a low pigment component concentration that comes in from the first suction port and liquid having a high pigment component concentration that comes in from the second suction port are mixed at the supply port and externally supplied, which ensures that liquid with a uniform pigment component concentration is supplied to the outside.

The vertical distribution of pigment component concentration of the liquid in the liquid storage container is not uniform depending on the location in the container. Therefore, in the liquid storage container disclosed in Japanese Patent Application Publication No. 2017-113891, in which the liquid is sucked and mixed from particular positions above and below in the vertical direction of the liquid storage container, the pigment component concentration of the liquid to be externally supplied may not be sufficiently uniform. Furthermore, the two flow paths, i.e., the first and second flow paths are necessary, which may lower the ratio of the storable amount of the liquid relative to the volume of the container. The present invention was made in view of the problems, and it is an object of the present invention to allow the precipitation component concentration to be uniform in a liquid storage container that can store liquid containing a precipitation component and externally supply the liquid.

SUMMARY OF THE INVENTION

A liquid storage container according to the present invention is a liquid storage container capable of storing a liquid containing a precipitation component and externally supplying the liquid, the liquid storage container comprising:

a storage portion that stores the liquid;

a supply port that opens to the outside of the storage portion;

a pipe having one end connected to the supply port and the other end connected a suction port that opens to the inside of the storage portion; and an agitation member provided near the suction port that agitates the liquid stored in the storage portion.

According to the present invention, a liquid storage container capable of storing liquid containing a precipitation component and externally supplying the liquid allows the liquid to be externally supplied to have a uniform precipitation component concentration.

Further features of the present invention will become apparent from the following description of exemplary embodiments with reference to the attached drawings.

BRIEF DESCRIPTION OF THE DRAWINGS

FIG. 5A is a top view of the storing member according to the first embodiment in use as viewed from above in the vertical direction (Z direction in FIG. 1), FIG. 5B is a sectional view taken along line A-A in FIG. 5A, FIG. 5C is a sectional view taken along line B-B in FIG. 5B;

FIG. 6A is a top view of the suction member in the liquid storage container according to the first embodiment in use in the vertical direction (Z direction in FIG. 1), FIG. 6B is a sectional view taken along line A-A in FIG. 6A, FIG. 6C is a front view as viewed in the Y direction in FIG. 6A;

FIG. 7A is a schematic view for illustrating the state in which a pigment component is settled without the operation of supplying the liquid, FIG. 7B is a schematic view for illustrating the operation of agitating the liquid, FIG. 7C is a schematic view for illustrating the state in which the agitating operation had stopped and the supplying operation has started, FIG. 7D is a schematic view for illustrating the state in which the settled pigment component has started to be diffused by the effect of the liquid agitation, FIG. 7E is a schematic view for illustrating the state in which the agitation operation has been resumed after a prescribed time period, FIG. 7F is a schematic view for illustrating the state in which the agitation operation has stopped after a prescribed time period after the start of the agitation operation;

FIG. 8A is a top view of the suction member in the liquid storage container according to the second embodiment in use as viewed from above in the vertical direction (Z direction in FIG. 1), FIG. 8B is a sectional view taken along line A-A in FIG. 8A, FIG. 8C is a front view as viewed in the Y direction in FIG. 8A; FIG. 9A is a top view of the suction member in the liquid storage container according to the third embodiment in use as viewed from above in the vertical direction (Z direction in FIG. 1), FIG. 9B is a sectional view taken along line A-A in FIG. 9A, and FIG. 9C is a front view as viewed in the Y direction in FIG. 9A.

DESCRIPTION OF THE EMBODIMENTS

Figure 1:
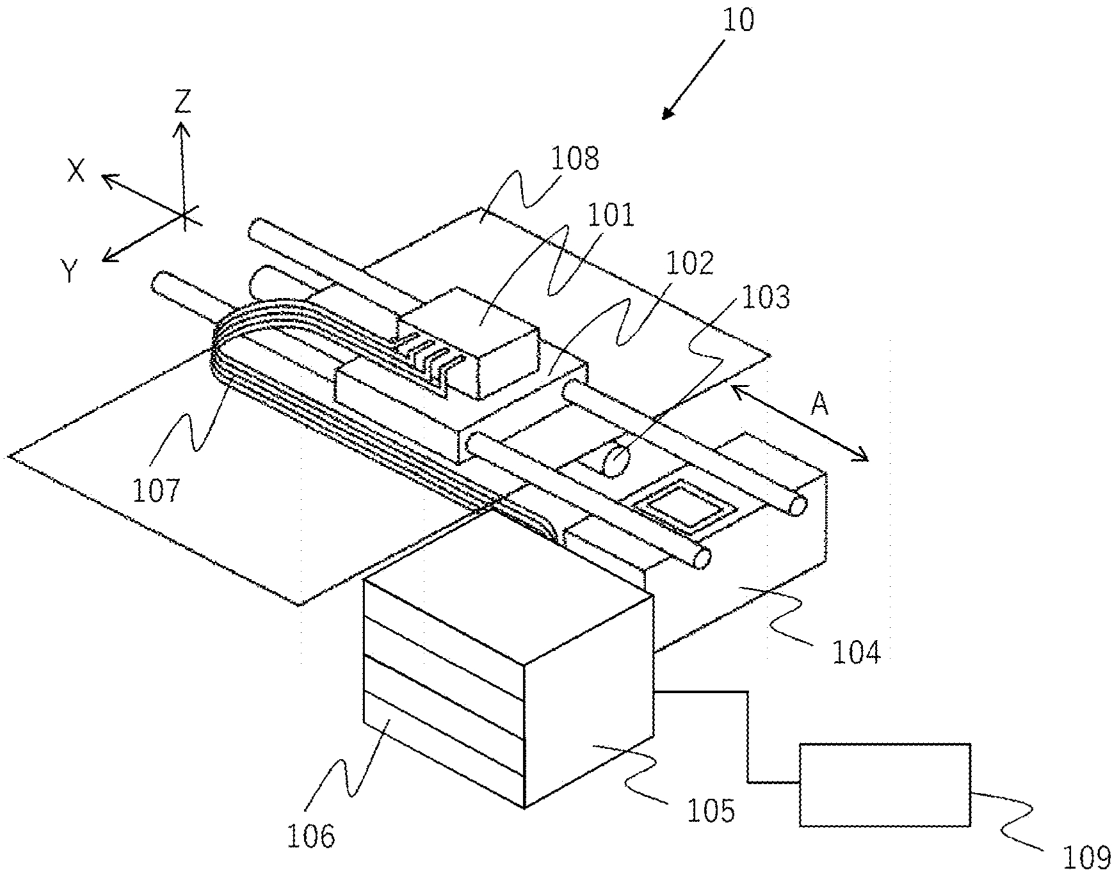
FIG. 1 is a schematic perspective view of a recording apparatus according to a first embodiment of the invention.

Preferred embodiments of the present invention will be described in conjunction with the accompanying drawings.

Note that in the following description, the elements with the same functions will be denoted by the same reference characters in the drawings and their descriptions will not be repeated. The embodiments may be combined or modified as appropriate within the scope of the present invention and are not intended to limit the scope of the invention.

First Embodiment

FIG. 1 is a perspective view of a general structure of a recording apparatus according to a first embodiment of the present invention. The recording apparatus 10 shown in FIG. 1 is an exemplary recording apparatus that performs recording on a recording medium using liquid supplied from a liquid consumption apparatus including a liquid storage container according to the invention. The recording apparatus 10 performs recording on a recording medium 108 such as a sheet by repeating reciprocating movement of a recording head 101 in the X-direction (main scanning) and transport of the recording medium 108 in the Y-direction (sub-scanning) at each prescribed pitch. The recording apparatus 10 selectively ejects liquid (pigmented inks) in multiple colors from the recording head 101 in synchronization with these kind of movements and causes the liquid to arrive at the recording medium 108 to form for example characters, symbols, and images on the recording medium 108. Any material can be used as the recording medium 108 if the material allows an image to form with arriving ink droplets. For example, the recording medium 108 may be made of any of various materials and in various forms such as paper, cloth, an optical disc label surface, a plastic sheet, an OHP sheet, and an envelope.

In FIG. 1, the recording head 101 is slidably supported on two guide rails extending in the X direction and is detachably mounted on a carriage 102, which moves linearly back and forth along the guide rails in the X direction by driving means such as a motor (not shown). The recording medium 108 is transported in the Y direction, which intersects the direction of movement (X direction) of the carriage 102 by a transport roller 103 as transport means, while the recording medium is opposed to the liquid discharge surface of the liquid discharge unit of the recording head 101. In this way, the recording medium 108 receives the liquid ejected from the recording head 101.

The recording head 101 has, as a plurality of liquid discharge units, a plurality of rows of nozzles for ejecting liquid in different colors. A plurality of independent trays 106 corresponding to the plurality of colors of liquid ejected from the recording head 101 are each detachably mounted to the liquid supply unit 105. The liquid supply unit 105 and the recording head 101 are connected by a plurality of liquid supply tubes 107 corresponding to the plurality of trays 106. The trays 106 each store a liquid storage container 1 which will be described. As the trays 106 are mounted to the liquid supply unit 105, liquid in various colors stored in the liquid storage containers 1 can be each independently supplied to a corresponding nozzle row of the recording head 101.

In a non-recording area A within the range of reciprocating movement of the recording head 101 in the X direction and outside the range of passage of the recording medium 108, a recovery unit 104 is arranged to face the liquid discharge surface of the recording head 101. The recovery unit 104 has a cap portion for capping the liquid discharge surface of the recording head 101, a suction mechanism for forcing liquid to be sucked while the liquid discharge surface is capped, and a cleaning blade for wiping dirt from the liquid discharge surface. The suction operation is performed by the recovery unit 104 prior to the recording operation of the recording apparatus 10. As a result, even when the recording apparatus 10 is put into operation after a long period of disuse, residual air bubbles in the liquid discharge unit of the recording head 101 and thickened liquid near the nozzles can be removed by the recovery unit 104 as the recovery processing is performed. As a result, fluctuations in the discharge characteristics of the recording head 101 can be reduced.

The recording apparatus 10 has a control unit 109 that controls the operation of various units of the recording apparatus 10. The control unit 109 has elements (which are not shown) such as a CPU, a memory that stores programs, and an input/output circuit. The control unit 109 includes for example the input/output circuit that receives, from an external device, data such as images to be recorded on the recording medium 108, operates a motor that drives a carriage 102 and a transport roller 103, and operates ejection of liquid by the recording head 101. The control unit 109 according to the first embodiment controls in particular the operation of passing current through a thin coil 64 as a magnetic field generating member (which will be described) provided in the liquid storage container 1 stored in the tray 106 and the operation of supplying liquid from the liquid storage container 1 to the recording head 101.

Figure 2:
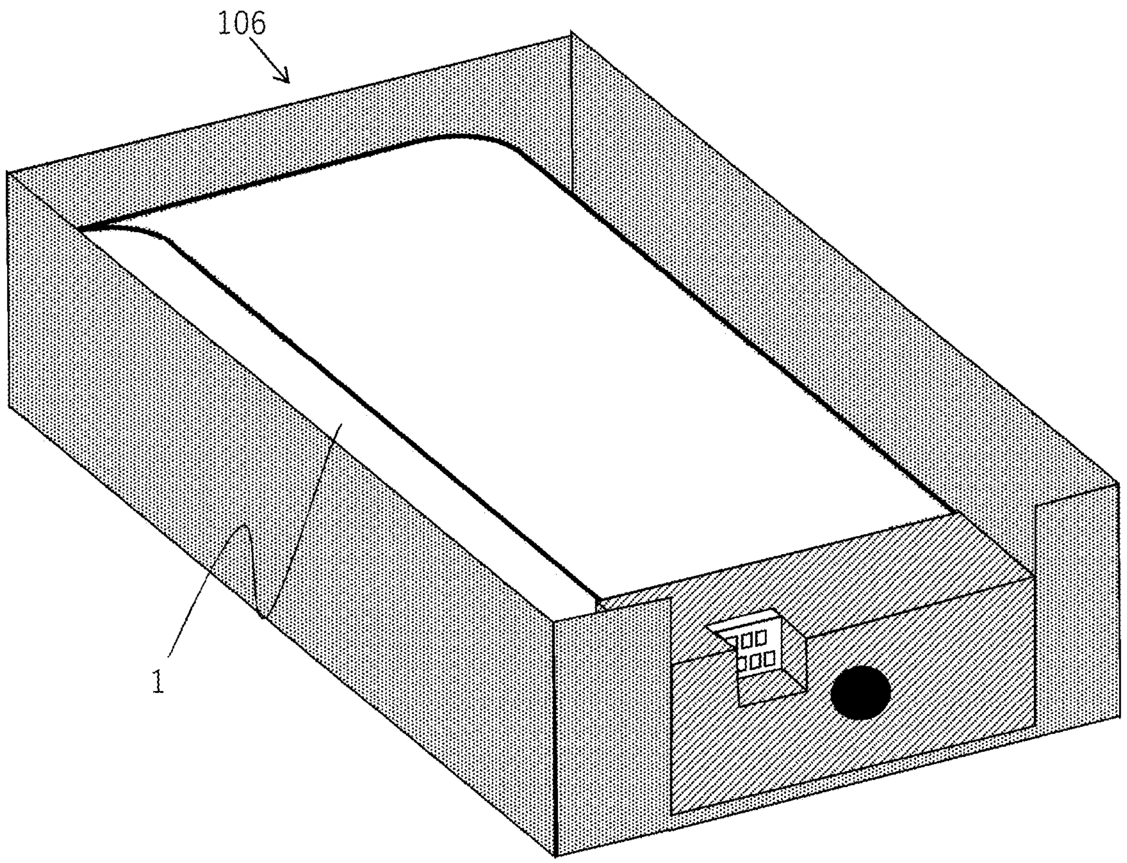
FIG. 2 is a schematic perspective view of a tray according to the first embodiment.

FIG. 2 is a schematic view of the structure of the tray 106 for each color provided in the liquid supply unit 105 of the recording apparatus 10. The tray 106 stores the liquid storage container 1.

Figure 3:
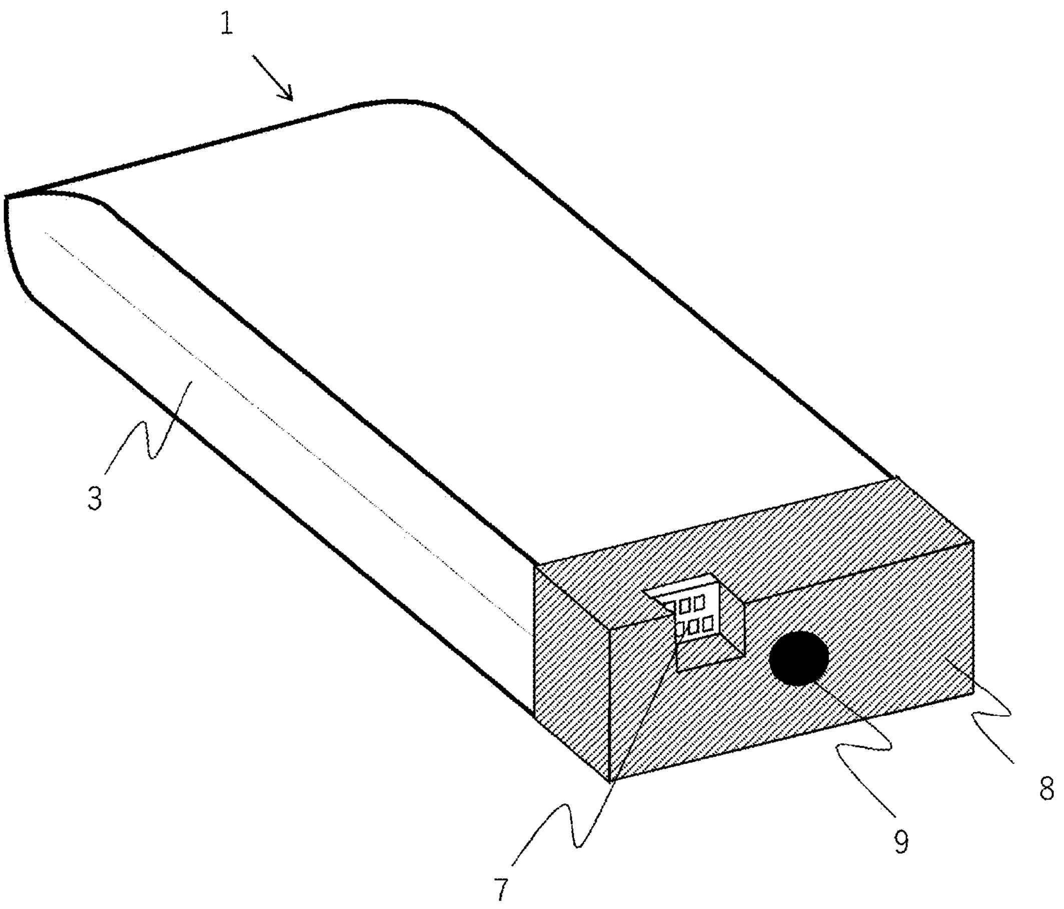
FIG. 3 is a schematic perspective view of a liquid storage container according to the first embodiment.

FIG. 3 is a perspective view of the structure of the liquid storage container 1. The liquid storage container 1 stores ink as liquid containing a pigment component that is a precipitation component and can externally supply the ink (to the recording head 101). The liquid storage container 1 has a storage member 3 that stores liquid, an opening 9 through which a spout 4 (which will be described) is inserted, a substrate 7 that exchanges power and information with the outside, and a connection 8 with the liquid supply unit 105.

Figure 4:
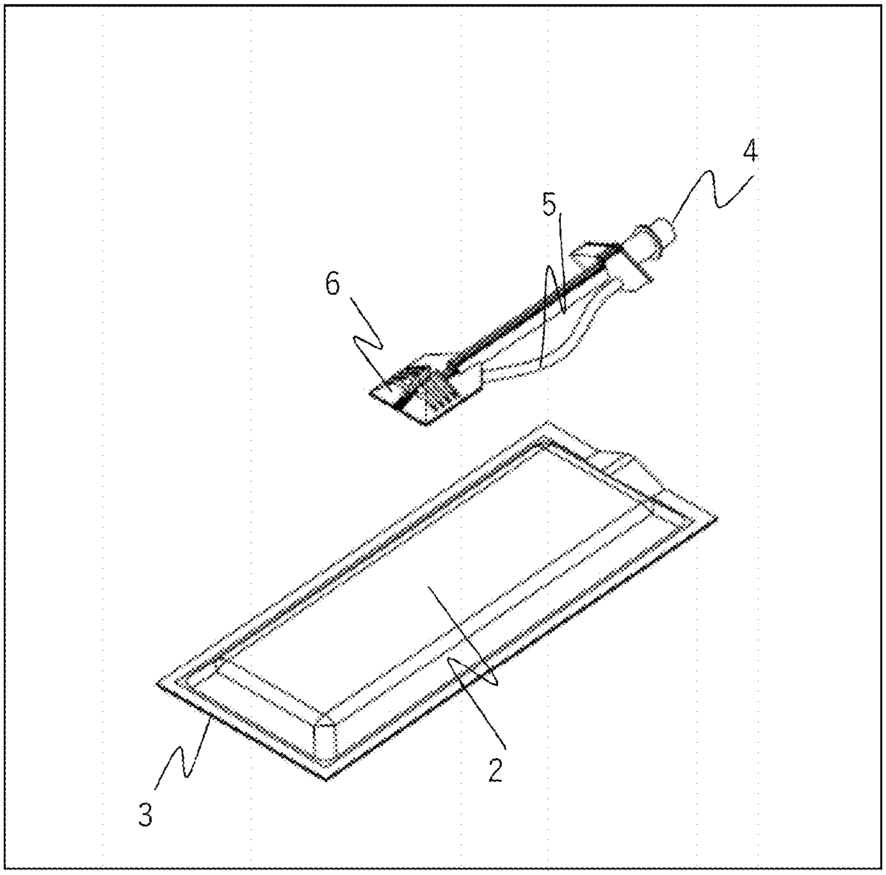
FIG. 4 is an exploded perspective view of a storing member according to the first embodiment.
Figure 5A:
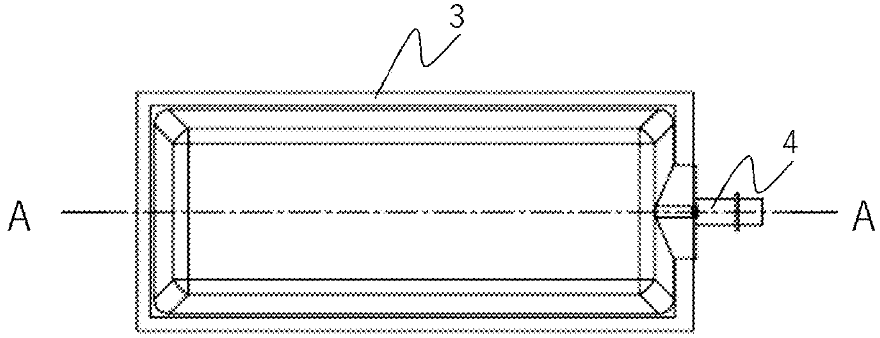
FIGS. 5A to 5C are schematic views of the storing member according to the first embodiment.
Figure 5C:
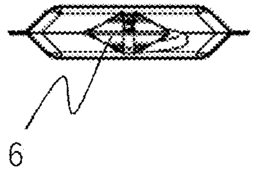
Figure 5B:
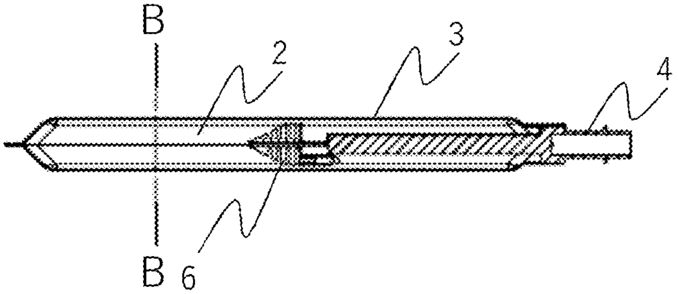

FIG. 4 is an exploded perspective view of the structure of the storage member 3. FIG. 5A is a top view of the storage member 3 in use as viewed from above in the vertical direction (Z direction in FIG. 1), FIG. 5B is a sectional view taken along line A-A in FIG. 5A, and FIG. 5C is a sectional view taken along line B-B in FIG. 5B. As shown in FIGS. 4 and 5A to 5C, the storage member 3 includes a storage portion 2 that stores liquid, the spout 4 that is a supply port that opens to the outside of the storage portion 2, a pipe 5 having one end connected to the spout 4 and the other end connected to the suction port (which will be described) that opens to the inside of the storage portion 2, and the suction member 6 with the suction port.

Figure 6A:
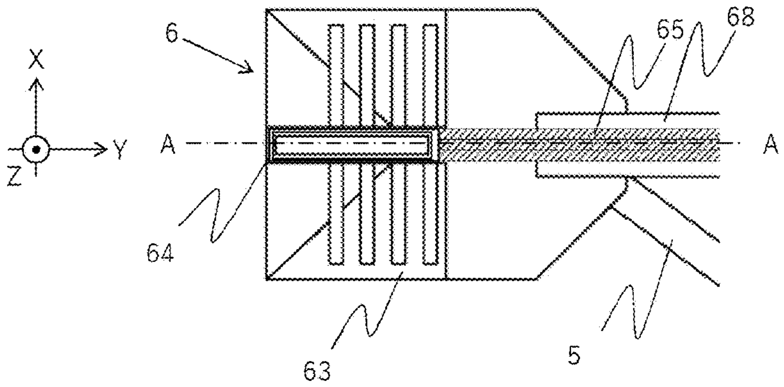
FIGS. 6A to 6C are schematic views of a suction member according to the first embodiment.
Figure 6C:
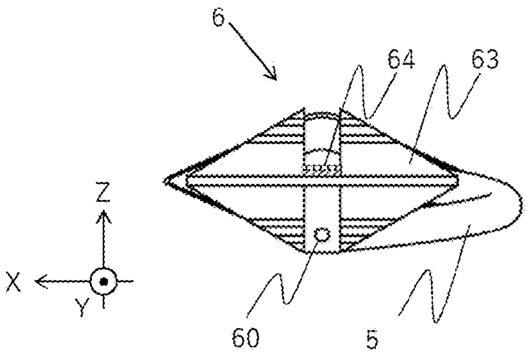
Figure 6B:
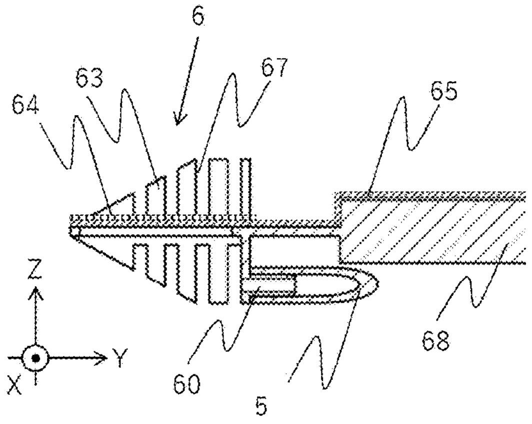

FIG. 6A is a top view of the suction member 6 in the liquid storage container 1 according to the first embodiment in use as viewed from above in the vertical direction (Z direction in FIG. 1), FIG. 6B is a sectional view taken along line A-A in FIG. 6A, and FIG. 6C is a front view as viewed in the Y direction in FIG. 6A. The suction member 6 has a suction port 60 that opens in a lower position in the vertical direction inside the storage portion 2 when the liquid storage container 1 is in use. The suction member 6 also has the thin coil 64 provided near the suction port 60 and above the suction port 60 in the vertical direction when the liquid storage container 1 is in use. The thin coil 64 is connected with a wiring 65 including for example a flexible board for supplying electric power from the outside. The thin coil 64 is a magnetic field generating member that generates a magnetic field by the passage of current therethrough via the wiring 65. The suction member 6 has a support 68 that supports the wiring 65. The suction member 6 is provided at one end of the support 68 and the spout 4 is provided at the other end. The wiring 65 is connected to a power supply (not shown) provided in the recording apparatus 10 through the substrate 7 of the liquid storage container 1. The suction member 6 has a slit 63 having a plurality of gaps 67 extending in the X and Z directions and arranged in the Y direction. The liquid storage container 1 according to the first embodiment has one pipe 5.

When liquid is sucked from the suction port 60, a magnetic field is generated by the passage of current through the thin coil 64, and the liquid inside the storage portion 2 is agitated. More specifically, the thin coil 64 is agitation member that agitates the liquid stored in the storage portion 2, and according to the first embodiment, the agitation member has the thin coil 64 as a magnetic field generating member provided near the suction port 60 to generate a magnetic field by the passage of current therethrough.

When the control unit 109 of the recording apparatus 10 executes supply operation including sucking liquid from the liquid storage container 1 stored in the tray 106 and supplying the liquid to the recording head 101, the unit first causes current to pass through the thin coil 64 to execute the operation of agitating the liquid stored in the liquid storage container 1. Then, after the agitation operation is executed, the supply operation is started. As a result, the pigment component contained in the liquid is uniformly dispersed in the liquid contained in the liquid storage container 1 before the start of the supply operation, so that the pigment component concentration in the liquid sucked from the suction port 60 can be made uniform. After the start of the liquid supply operation, the control unit 109 intermittently executes the agitation operation while the supply operation is in progress. For example, while the supply operation is in progress, the agitation operation is repeatedly executed for a prescribed first time period at intervals of a prescribed second time period. The control unit 109 causes current to pass through the thin coil 64 during the first time period and stops the passage of current through the thin coil 64 during the second time period. The first and second time periods may take fixed values or variable values depending on the size of the recording medium 108 and the recorded contents such as images. The first and second time periods may be determined for example on the basis of experimental observation results or theoretical calculations of the settling speed of the pigment component or the degree of diffusion of the pigment component due to the magnetic field generated by the thin coil 64. Current may be made to pass through the thin coil 64 during the supplying operation to continue the agitation operation by setting the second time period to zero.

In this way, the liquid with a uniform pigment component concentration can be supplied externally from the liquid storage container 1 (to the recording head 101). In addition, since the liquid storage container 1 according to the first embodiment includes only the one pipe 5 that communicates between the inside of the storage portion 2 and the spout 4, the ratio of the storable amount of liquid relative to the volume of the liquid storage container 1 can be increased.

Figure 7A:
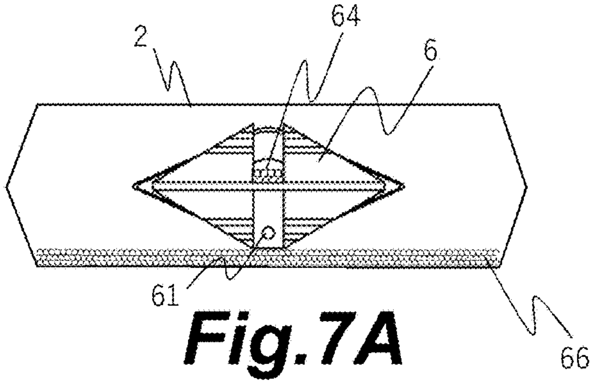
FIGS. 7A to 7F are schematic views for illustrating various states of liquid during supply of liquid according to the first embodiment.
Figure 7D:
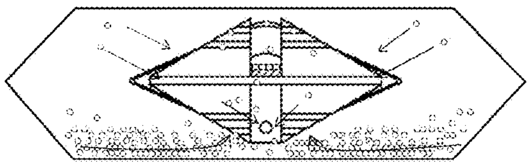
Figure 7B:
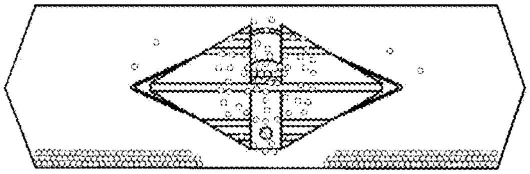
Figure 7E:
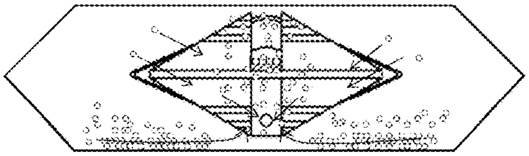
Figure 7C:
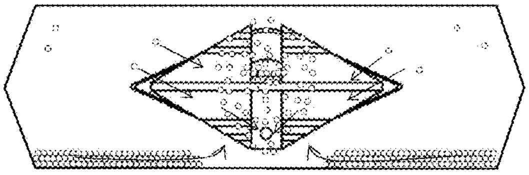
Figure 7F:
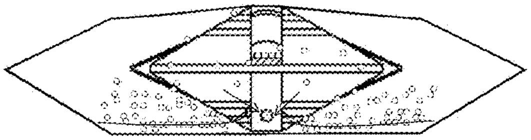

FIGS. 7A to 7F are schematic views for illustrating the state of the liquid in the storage portion 2 of the liquid storage container 1 when the control unit 109 executes the liquid supply operation in the recording apparatus 10 according to the first embodiment. FIG. 7A shows the state in which the liquid supply operation has not been executed for some time and the pigment component 66 has settled in the liquid in the storage portion 2. FIG. 7B shows the state in which the pigment component 66 is diffused in the liquid by agitation operation by the passage of current through the thin coil 64 to generate a magnetic field to agitate the liquid in the vicinity of the thin coil 64 before the supply operation is executed. FIG. 7C shows the state in which the agitation operation is stopped and the supply operation is started by interrupting the passage of current through the thin coil 64, thereby stopping the magnetic field generation. In FIG. 7C, the arrows indicate the movement of the liquid with the pigment component 66 that are sucked into the suction port 60. The concentration of the pigment component 66 in the liquid around the thin coil 64 in the vicinity of the suction port 60 is equalized by the agitation operation, and the liquid containing the pigment component 66 with a uniform concentration is sucked in through the suction port 60. FIGS. 7D to 7F show how the supply operation continues to be executed thereafter. FIG. 7D shows that the settled pigment component 66 has started to diffuse to some extent due to the liquid agitation effect in the storage portion 2 caused by the suction of the liquid from the suction port 60. FIG. 7E shows that after the interruption of the agitation operation in FIG. 7C, a second time period has elapsed, and the agitation operation has been resumed. The pigment component 66 that had settled in the storage portion 2 due to the agitation operation is further diffused. FIG. 7F shows the state in which the agitation operation has stopped after the first time period has elapsed from the start of the agitation operation in FIG. 7E. By intermittently executing the agitation operation during the execution of the supply operation in this manner, the pigment component 66 in the liquid near the suction port 60 is effectively diffused in the storage portion 2, so that liquid having the pigment component 66 with a uniform concentration can be supplied externally (to the recording head 101).

Second Embodiment

Figure 8A:
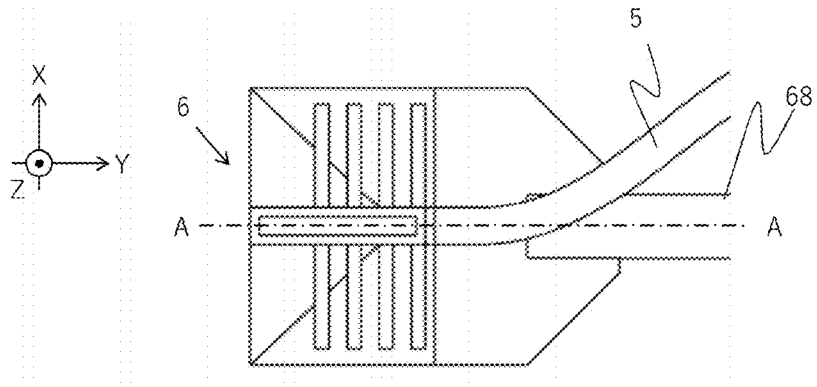
FIGS. 8A to 8C are schematic views of a suction member according to a second embodiment of the invention.
Figure 8C:
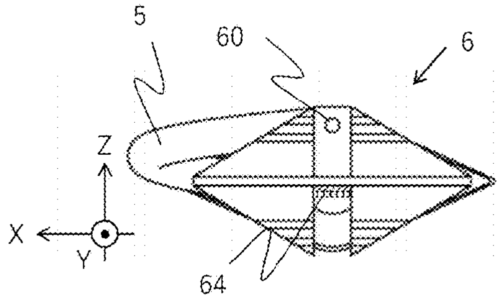
Figure 8B:
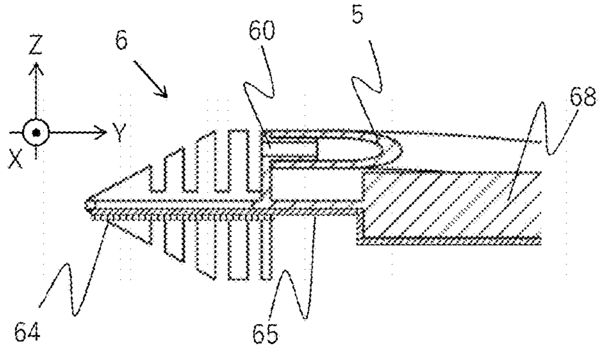

FIG. 8A is a top view of a suction member 6 in a liquid storage container 1 according to a second embodiment of the invention in use as viewed from above in the vertical direction (Z direction in FIG. 1), FIG. 8B is a sectional view taken along line A-A in FIG. 8A, and FIG. 8C is a front view viewed in the Y direction in FIG. 8A. In contrast to the structure according to first embodiment, in the liquid storage container 1 according to the embodiment 2, the suction member 6 has a suction port 60 that opens in a higher position in the storage portion 2 in the vertical direction when the liquid storage container 1 is in use. The suction member 6 also has a thin coil 64 provided near the suction port 60 and below the suction port 60 in the vertical direction when the liquid storage container 1 is in use. Other elements are identical to those according to the first embodiment, and detailed description thereof will not be provided.

Similarly to the first embodiment, when liquid is sucked from the suction port 60, a magnetic field is generated by the passage of current through the thin coil 64, and the liquid inside the storage portion 2 is agitated. In this way, liquid with a uniform pigment component concentration can be supplied externally from the liquid storage container 1 (to the recording head 101). In addition, since the liquid storage container 1 according to the second embodiment includes only one pipe 5 that communicates between the inside of the storage portion 2 and the spout 4, the ratio of the storable amount of the liquid to the volume of the liquid storage container 1 can be increased.

Third Embodiment

Figure 9A:
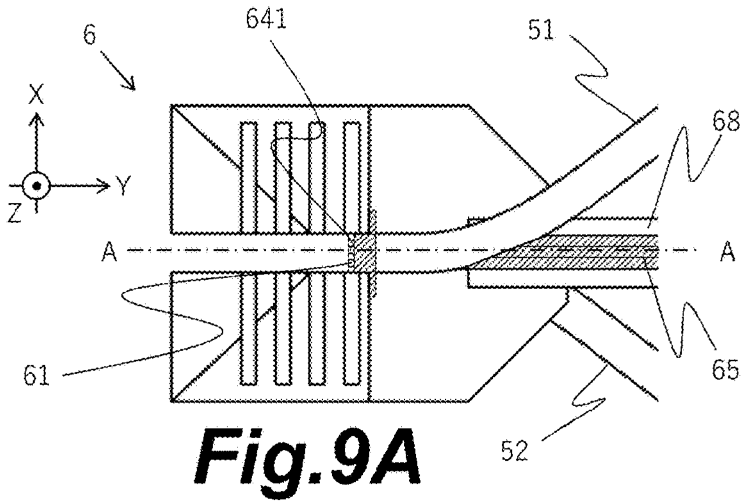
FIGS. 9A to 9C are schematic views of a suction member according to a third embodiment of the invention.
Figure 9C:
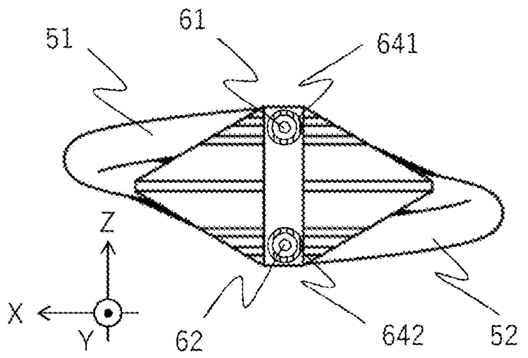
Figure 9B:
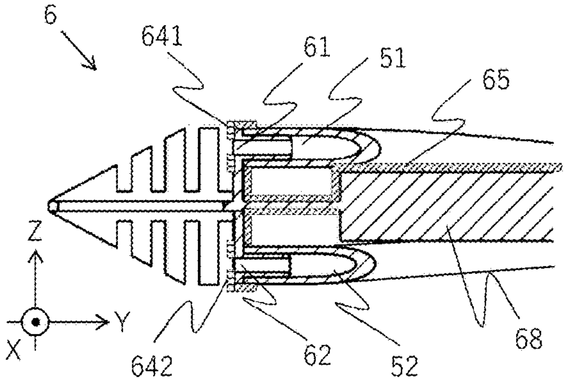

FIG. 9A is a top view of a suction member 6 in a liquid storage container 1 according to a third embodiment of the invention in use as viewed from above in the vertical direction (Z direction in FIG. 1), FIG. 9B is a sectional view taken along line A-A in FIG. 9A, and FIG. 9C is a front view as viewed in the Y direction in FIG. 9A. In contrast to the first and second embodiments, in the liquid storage container 1 according to the third embodiment, the suction member 6 has a plurality of pipes, a first pipe 51 and a second pipe 52. The first pipe 51 has one end connected to a spout 4 and the other end connected to a first suction port 61 that opens in a higher position in the vertical direction in the storage portion 2 when the liquid storage container 1 is in use. The second pipe 52 has one end connected to the spout 4 and the other end connected to a second suction port 62 that opens in a lower position in the vertical direction in the storage portion 2 when the liquid storage container 1 is in use. The first pipe 51 and the second pipe 52 join at the spout 4.

A first coil 641 and a second coil 642 are provided around the first suction port 61 and the second suction port 62, respectively. Electric power is externally supplied to the first coil 641 and the second coil 642 through a wiring 65. The first coil 641 and the second coil 642 function as a magnetic field generating member that generates a magnetic field by the passage of current through the wiring 65 and function as an agitating member that agitates the liquid around the first coil 641 and the second coil 642 by the magnetic field. When liquid is sucked from the first suction port 61 and the second suction port 62, a magnetic field is generated by the passage of current through the first coil 641 and the second coil 642. In this way, the liquid inside the storage portion 2 is agitated around the first and second coils 641 and 642, especially in the vicinity of the first and second suction ports 61 and 62. This allows liquid with a uniform pigment component concentration to be supplied externally from the liquid storage container 1 (to the recording head 101).

According to the description of the third embodiment, the two suction ports with the coils therearound are provided and the plurality of pipes are provided by way of illustration, but a structure having one suction port with a thin coil therearound and one pipe may be provided similarly to the first and second embodiments.

According to the above described embodiments, the exemplary apparatus includes, as agitation member that agitates liquid stored in the storage portion 2 of the liquid storage container 1, a coil as a magnetic field generating member that generates a magnetic field by the passage of current therethrough. In the described example, the coil is provided near a suction port that opens in the storage portion. However, the agitating member such as a coil may be provided at any position such as any position of a support 68 or at any position of the suction member 6 such as at a slit 63 if the position allows the liquid contained in the storage portion 2 to be agitated. In this case, the agitating member may be provided so that the fluid in the vicinity of the suction port can be agitated, or the agitating member may be provided so that the entire fluid inside the storage portion 2 can be agitated. The support 68 may be provided to extend from an arbitrary position of the storage member 3 separately from the pipe 5 having ends connected with the spout 4 and the suction port of the suction member 6, and agitation member such as a coil may be provided at the tip of the support. The agitation member may be other than the magnetic field generating member if the means allows the liquid contained in the storage portion 2 to be agitated. For example, a member such as a screw driven by the passage of current to agitate the fluid by physically contacting and acting on the fluid may be provided or a member such as a piezoelectric element that agitates the fluid by means that locally varies the pressure of the fluid may be provided.

According to the present invention, a liquid storage container capable of storing liquid containing a precipitation component and externally supplying the liquid allows the liquid to be externally supplied to have a uniform precipitation component concentration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-069349, filed on Apr. 20, 2022, which is hereby incorporated by reference herein in its entirety.

What is claimed is:

1. A liquid storage container storing a liquid containing a precipitation component and externally supplying the liquid, the liquid storage container comprising:

a storage portion that stores the liquid;

a supply port that opens to the outside of the storage portion;

a pipe having one end connected to the supply port and the other end connected to a suction port that opens to the inside of the storage portion; and an agitation member provided near the suction port that agitates the liquid stored in the storage portion.

2. The liquid storage container according to claim 1, wherein the agitation member has a magnetic field generating member to generate a magnetic field by applying current.

3. The liquid storage container according to claim 2, wherein the magnetic field generating member is a coil.

4. The liquid storage container according to claim 3, further comprising a wiring for externally supplying the magnetic field generating member with electric power.

5. The liquid storage container according to claim 1, wherein the agitation member is provided below the suction port in the vertical direction when the liquid storage container is in use.

6. The liquid storage container according to claim 1, wherein the agitation member is provided above the suction port in the vertical direction when the liquid storage container is in use.

7. The liquid storage container according to claim 1, wherein the agitation member is provided to surround the suction port.

8. The liquid storage container according to claim 1, wherein the suction port opens in a lower position inside the storage portion in the vertical direction when the liquid storage container is in use.

9. The liquid storage container according to claim 1, wherein the suction port opens in an upper position inside the container in the vertical direction when the liquid storage container is in use.

10. The liquid storage container according to claim 1, comprising a plurality of the pipes, wherein a first suction port connected to a first pipe of the plurality of pipes opens in a higher position in the storage portion in the vertical direction when the liquid storage container is in use, and a second suction port connected to a second pipe of the plurality of pipes opens in a lower position inside the storage portion in the vertical direction when the liquid storage container is in use.

11. The liquid storage container according to claim 1, wherein the liquid is an ink containing a pigment component as the precipitation component.

12. A liquid consumption apparatus comprising the liquid storage container according to claim 1; and a controller that controls the operation of the agitation member and the operation of supplying the liquid externally from the supply port.

13. The liquid consumption apparatus according to claim 12, wherein the controller carries out such control that agitation operation for agitating the liquid stored in the liquid storage container by the agitation member is performed, and then the operation of supplying the liquid is started.

14. The liquid consumption apparatus according to claim 12, wherein the controller controls the agitation member to perform the operation of agitating the liquid intermittently during the operation of supplying the liquid.

15. A recording apparatus comprising the liquid consumption apparatus according to claim 12, wherein recording is carried out on a recording medium with liquid supplied by the liquid consumption apparatus.

* * * * *